United States Patent [19]

Hill et al.

[11] Patent Number: 5,382,439
[45] Date of Patent: Jan. 17, 1995

[54] PRODUCT AND PROCESS OF IMPROVING THE STABILITY OF VITAMIN D

[75] Inventors: Jerry L. Hill, Johnstown; Benjamin D. Travis, Westerville; Mohamed I. Mahmoud, Columbus; James R. Brooks, West Worthington; Timothy W. Schenz, Powell; Normanella T. Dewille, Upper Arlington, all of Ohio

[73] Assignee: Abbott Laboratories, Abbott Park, Ill.

[21] Appl. No.: 61,885

[22] Filed: May 14, 1993

[51] Int. Cl.⁶ .................. A23L 1/303; A23L 1/304
[52] U.S. Cl. .................................. 426/73; 426/72; 426/801
[58] Field of Search ........................ 426/73, 72, 801

[56] References Cited

U.S. PATENT DOCUMENTS

| | | | |
|---|---|---|---|
| 2,777,797 | 1/1957 | Hochberg et al. | 426/73 |
| 4,935,257 | 6/1990 | Yajima | 426/73 |
| 5,153,012 | 10/1992 | Ohtaka et al. | 426/73 |

OTHER PUBLICATIONS

Sertl et al., "Liquid Chromatographic Determination of Vitamin D in Milk and Infant Formula", Journal of the Association of Official Analytical Chemists, vol. 68, No. 2, pp. 177–182 (1985).

Haddad, "Vitamin D–Solar Rays, the Milky Way, or Both?", The New England Journal of Medicine, vol. 36, No. 18, pp. 1213–1215 (1992).

Primary Examiner—Helen Pratt
Attorney, Agent, or Firm—Lonnie R. Drayer; Donald O. Nickey

[57] ABSTRACT

A method for improving the stability of Vitamin D in liquid nutritional products which contain hydrolyzed protein or free amino acids as a nitrogen source. Vitamin C is added to a liquid nutritional product at a concentration exceeding 300 mg/l, such that the concentration of Vitamin C is at least 300 mg/l during the shelf-life of the liquid nutritional product. Preferably the addition of Vitamin C occurs after the completion of preliminary heat treating of the liquid nutritional product. Alternatively, the addition of Vitamin C occurs prior to the preliminary heat treating of the liquid nutritional product. Preferably, an emulsifier is added to the liquid nutritional product prior to preliminary heat treating, with the emulsifier being a diacetyltartaric acid ester of monoglycerides and diglycerides; and cystine is added following the completion of preliminary heat treating.

5 Claims, No Drawings

PRODUCT AND PROCESS OF IMPROVING THE STABILITY OF VITAMIN D

TECHNICAL FIELD OF INVENTION

The present invention relates generally to a method of stabilizing Vitamin D in liquid nutritional products that contain partially hydrolyzed proteins, amino acids, or protein hydrolysates, and more specifically to a method of stabilizing Vitamin D in such products by the addition of Vitamin C at a level exceeding 300 mg/l, such that the Vitamin C concentration is at least 300 mg/l at any time during the shelf-life of the liquid nutritional product. A liquid nutritional product made in accordance with this method is also disclosed.

BACKGROUND ART

The beneficial qualities of Vitamin D are well documented and accepted. For example, Vitamin D regulates the calcium level in the body and is responsible for depositing calcium and phosphorous into bone and the blood. Too little Vitamin D can cause soft bones, muscle weakness, poor growth, bone fractures, and secondary hyperthyroidism. Although vitamin supplements in tablet form may be taken, Vitamin D is easily obtainable from the diet, especially a diet containing Vitamin D enriched foods.

Vitamin D is a fat soluble vitamin produced from ergosterol and 7-dehydrocholesterol following exposure to sunlight. It is essential for the prevention of rickets, a disease in which the matrix of new bone is not mineralized. The most common biologically active forms of Vitamin D are previtamin D2 and D3, and vitamin D2 and D3. Previtamin D2 and vitamin D2 are produced from ergosterol and are biologically active in humans, cattle, swine and other mammals, but not in poultry. Previtamin D3 and vitamin D3 are biologically active and are produced in the skin of many animals following irradiation of 7-dehydrocholesterol. The other isomeric forms of vitamin D show no significant biological activity.

The structure of vitamin D2 shows a double bond at the C22 position and a methyl group at the C24 position that vitamin D3 lacks. For both types of vitamin D, the conversion of the previtamins to the active form involves a rupture of the ring and loss of the true sterol identity. As a result of the ring rupture 64 different isomers are theoretically possible. Only a few of the isomers occur naturally or during the synthesis of vitamin D.

The isomerization of previtamin D to vitamin D occurs in solution. The proportions depend on the temperature of the system and the time allowed for equilibrium. When vitamin D is prepared by irradiation the products include other isomeric forms such as tachysterol and lumisterol. These forms are not biologically active. Light, high temperatures and iodine also catalyze the conversion of the biologically active forms of vitamin D to inactive forms.

One excellent source of Vitamin D is liquid nutritional products which are fortified with Vitamin D. The term liquid nutritional product is meant to include any liquid consumed as part of a diet, which liquid has significant nutritional qualities. Examples include infant formula, milk, and even high caloric liquids such as Exceed® and Ensure®, which are manufactured by the Ross Laboratories Division of Abbott Laboratories, Columbus, Ohio U.S.A.

With respect to infant formula, Vitamin D levels in infant liquid nutritional products are federally regulated in the U.S.A. by the Infant Formula Act (IFA). Levels above or below those set forth in the IFA may not legally be offered for sale. There are basically three types of infant formula: milk-based, soy-based, and protein hydrolysate-based. Some infants' immune systems experience an undesirable reaction to the protein found in milk-based or soy-based formula. The form of reaction may include one or more of the following: rash, dermatitis, diarrhea, crying or vomiting. In a protein hydrolysate-based liquid nutritional product for infants the nitrogen source is hydrolyzed protein or a free amino acid. Hydrolyzed protein is protein which has been broken down into much smaller peptides. Infants who experience adverse reactions to protein often are able to digest hydrolysate-based liquid nutritional products. As used herein "protein" is understood to relate to sources of proteins from plants and from animals.

However, protein hydrolysates have a major problem when it comes to Vitamin D. Vitamin D undergoes significant degradation. Until now the precise reason has not been generally known. However, it has been discovered that the reasons include: (1) the hydrolyzed protein source, (2) the method(s) of hydrolysis and (3) the presence of cysteine and its dimer, cystine (free or combined). Typical sources of hydrolyzed protein include casein, soy, whey and rice proteins. In fact, research has shown that the more hydrolyzed the protein, the worse the degradation. Furthermore, with respect to the presence of cysteine and cystine, it was discovered that cystine, and cysteine (which oxidizes to cystine, its dimer) induce Vitamin D degradation, typically by causing isomerization.

In view of the problems with Vitamin D degradation in liquid nutritional products having hydrolyzed protein or free amino acids as a nitrogen source, and by this is meant that hydrolyzed protein or free amino acids comprise the principal nitrogen source of the liquid nutritional product, some products in the liquid nutritional product industry have been over fortified with Vitamin D, apparently in an attempt to meet the label claims for Vitamin D content in the long term. However, as has been mentioned above, acceptable upper limits of Vitamin D concentration exist, since too much Vitamin D can cause hypercalcemia, hypercalciuria, urinary tract stones, extraskeletal calcifications, and malfunction of the kidneys and other organs.

If the Vitamin D concentration in a packaged liquid nutritional product exceeds the limits, the product may not be offered for sale until the Vitamin D concentration, through degradation, drops to an acceptable level. Similarly, if the Vitamin D concentration drops below acceptable lower limits, the product must be removed from sale to the public. The costs associated with replacing, shipping, and overall monitoring of the Vitamin D level in liquid nutritional products subject to significant Vitamin D degradation is enormous.

It is thus apparent that the need exists for a method to improve the stability of Vitamin D in the presence of protein hydrolysates, especially liquid nutritional products. Additionally, it should be understood the references to protein hydrolysates refer to partially or totally hydrolyzed proteins.

DISCLOSURE OF THE INVENTION

There is disclosed herein a method for improving the stability of Vitamin D in liquid nutritional products, which nutritional products utilize hydrolyzed protein or free amino acids as a nitrogen source, with the method comprising the addition of Vitamin C such that the initial concentration of Vitamin C is at least 300 mg/l during the shelf-life of the liquid nutritional. Preferably the addition of Vitamin C occurs after completion of preliminary heat treating the liquid nutritional product. Alternatively, the addition of Vitamin C occurs prior to the preliminary heat treating of the liquid nutritional product. As used herein "preliminary heat treating" is understood to mean a process comprising one or more of the following procedures conducted in any sequence suitable for a particular liquid nutritional product: emulsification, homogenization, pasteurization, High Temperature Short Time (HTST) heat treatment, and Ultra High Temperature (UHT) heat treatment, but not including terminal sterilization or retorting.

The method preferably includes the step of adding cystine to the liquid nutritional product after completion of the preliminary heat treating of the liquid nutritional product. The method also preferably includes the step of adding an emulsifier to the liquid nutritional product prior to the preliminary heat treating, with the emulsifier preferably comprising a diacetyltartaric acid ester of monoglycerides and diglycerides. The method has the Vitamin C when added having a fortification concentration exceeding 300 mg/l. More preferably, the method has the Vitamin C when added having a fortification concentration in the range of 300–1000 mg/l for use with nutritional products for adults and 300–750 mg/l for use with nutritional products for infants.

There is also disclosed a method for improving the stability of Vitamin D in liquid nutritional products for infants which utilize hydrolyzed protein or free amino acids as a nitrogen source, with the method comprising the addition of Vitamin C such that the concentration of Vitamin C is at least 300 mg/l at any time during the shelf-life of the liquid nutritional product for infants. Preferably the addition of Vitamin C occurs after completion of preliminary heat treating of the liquid nutritional. "Shelf life" is understood to mean the length of time, starting on the date that manufacture is completed, that a liquid nutritional product is guaranteed to meet the nutrient levels claimed on the product's label. Alternatively, the addition of Vitamin C occurs prior to the preliminary heat treating of the liquid nutritional product.

The method preferably includes the step of adding cystine to the liquid nutritional product after the completion of preliminary heat treating of the liquid nutritional product. The method also preferably includes the step of adding an emulsifier to the liquid nutritional product prior to the preliminary heat treating, with the emulsifier preferably comprising a diacetyltartaric acid ester of monoglycerides and diglycerides. The method has the Vitamin C when added having a fortification concentration exceeding 300 mg/l. More preferably, the method has the Vitamin C when added having a fortification concentration in the range of 300–1000 mg/l for use with adult nutritionals and 300–750 mg/l for use with infant nutritionals.

There is also disclosed a method for improving the stability of Vitamin D in liquid nutritional products for infants which utilize hydrolyzed protein or free amino acids as a nitrogen source, with the method comprising the steps of:

(a) adding an emulsifier to the liquid nutritional product prior to the preliminary heat treating;

(b) adding Vitamin C to the liquid nutritional after the completion of preliminary heat treating of the liquid nutritional product, such that the concentration of Vitamin C is at least 300 mg/l at any point during the shelf-life of the liquid nutritional product; and (c) adding cystine to the liquid nutritional after the completion of preliminary heat treating of the liquid nutritional product.

Preferably the emulsifier comprises a diacetyltartaric acid ester of monoglycerides and diglycerides. The method has the Vitamin C when added having a fortification concentration exceeding 300 mg/l. More preferably, the method has the Vitamin C when added having a fortification concentration in the range of 300–1000 mg/l for nutritional products for adults and 300–750 mg/l for nutritional products for infants. Preferably the Vitamin C is added after the completion of preliminary heat treating of the liquid nutritional product although it can be added before beginning preliminary heat treating.

The present invention provides a method for improving the stability of Vitamin D liquid nutritional products having hydrolyzed protein or free amino acids as their primary nitrogen source. The method is extremely easy to practice and very reliable.

Another object of the present invention is to provide a method for improving the stability of Vitamin D concentration in liquid nutritional products having hydrolyzed protein or free amino acids as their primary nitrogen source, which method is compatible with present preliminary heat treating and sterilization methods of such liquid nutritional products.

Other objects and advantages of the invention will be apparent from the following description and the appended claims.

The degradation mechanism is set forth in detail below. This research has discovered that the Vitamin D degradation mechanism is a protein mediated free radical mechanism involving the reversible reaction of Vitamin D with a thiyl radical to form beta-thioalkyl free radical intermediates. The thiyl radical is produced by various reactions from the thiol moieties, including free cysteine, cysteine-containing peptides, and other thiols. The cysteine and cysteine-containing peptides result from the enzymatic reactions employed to create a protein hydrolysate, as well as through the thermal dissociation/chemical reduction of cystine. Cystine may exist as a free amino acid or as a result of oxidation of cysteine. Cystine is a dipeptide which contains a disulfide bond. A low energy of activation is required to split it into two very reactive thiol radicals.

There are several ways that a thiyl radical can be formed from a thiol. The first is that an initiator can undergo homolytic cleavage to yield a free radical which will then abstract a hydrogen atom from an organic molecule to yield another organic free radical. A second approach is direct metal catalyzed generation of a free radical from a molecule. Another approach utilizes a metal catalyzed formation of free radicals from an organic molecule via an organic hydroperoxide.

Generation of an organic free radical by direct auto-oxidation of an organic molecule is a fourth method of thiyl radical formation. Once a free radical is generated, it can react with cystine or cysteine by displacement to yield a cysteinyl free radical, which is a thiyl radical. A fifth way that formation of a thiyl radical can be initiated is by the auto-oxidation of cysteine to create a cysteinyl free radical.

An extremely important propagation reaction is the reaction between the cysteinyl free radical and Vitamin D. The cysteinyl free radical is a poor abstractor of hydrogen which prolongs its lifetime. The lower heteroatom-H bond dissociation energies allow for an enhanced rate of formation of the thiyl radical. The thiyl radical undergoes a reversible reaction with unsaturated organic compounds, such as Vitamin D. A beta-thioalkyl radical is formed by addition of the thiyl radical and Vitamin D with a resultant loss of cis-trans configuration. The reaction is enhanced by the tendency of vitamin D to undergo a 1,7-sigmatropic shift. The new free radical is a poor hydrogen abstracter, which usually results in decomposition of the free radical to the original thiyl radical, and Vitamin D or an isomer of Vitamin D. The thiyl radical is then free to attack other compounds, including Vitamin D.

The degradation of Vitamin D involves a primary thiyl radical induced isomerization of Vitamin D. The hydrogen atoms attached to carbon 6 and carbon 7 of Vitamin D are particularly susceptible to abstraction by the thiyl radical due to their attachment at the center (alpha) of the conjugated bonds. Isomerization would occur readily in any similar system. Hydrogen atoms could be abstracted from systems which are not conjugated, but in which hydrogen atoms are in bisallylic positions, adjacent (beta) to the two double bonds. This situation occurs in some fatty acids.

Vitamin D must be totally separated from cyst(e)ine to eliminate cyst(e)ine induced Vitamin D degradation. However, this is not readily achieved in a liquid system. Vitamin D degradation occurs primarily by a reversible free-radical mechanism involving cysteine as thiyl radical precursor which is responsible for the isomerization of Vitamin D to inactive isomers. The lower strain energy of the 5,6-trans isomer of Vitamin D and of tachysterol results in the eventual preponderance of the inactive isomers over the fully active 5,6-cis isomer. The free radical auto-oxidation processes participate as initiators and propagators which results in the oxidation of Vitamin D and its isomers. Stearic hinderance at Vitamin D or a thiol reduce the reaction rate. Large thiols, such as glutathione yield lower Vitamin D degradation rates than smaller thiols, such as cysteine. Vitamin D degradation rates are also slower for Vitamin D palmitate than for Vitamin D acetate, but Vitamin D degradation rates are similar for Vitamin D acetate and Vitamin D (alcohol).

EXPERIMENT-METHOD FOR DETERMINING AMOUNT OF VITAMIN D IN SOLUTION

In order to determine whether the method of the invention affected Vitamin D degradation, it was necessary to determine the concentration of Vitamin D in solution. The method used to determine the amount of Vitamin D in solution was a modification of the method published by Sertl and Molitor, *Journal of the Association of Official Analytical Chemists*, Volume 68, Number 2, 177–182 (1985). The method consists of saponifying the sample, extracting the saponified sample, subjecting the extract to preliminary liquid chromatography, clean-up, and subjecting the cleaned-up extract to quantitative liquid chromatography.

In a 250 ml flask, add 30 g of product, 1.5 g ascorbic acid (reagent grade), 30 ml reagent alcohol (5% 2-propanol, 95% specially denatured alcohol Formula 3A, reagent grade), and 35 ml of 45% potassium hydroxide (reagent grade). The flask is then flushed with nitrogen and saponified, with continued stirring, for 16 to 20 hours at room temperature. The resultant solution is transferred to a 500 ml separatory funnel, and 130 ml ethyl ether (anhydrous, 98% min., reagent grade or better) is added to the solution. The solution is shaken vigorously for 30 seconds. 130 ml of petroleum ether (35–60° C., reagent grade or better) is added and the solution is again shaken vigorously for 30 seconds. The layers should be allowed to separate and then the lower, aqueous layer is transferred to a second separatory funnel. The aqueous layer is extracted a second time, as above, with 130 ml of ethyl ether and then 130 ml of petroleum ether. The layers are allowed to separate and the aqueous layer is discarded. Each organic layer is washed three times with 50 ml water and 5 ml reagent alcohol. To prevent the formation of an emulsion, washing should be performed only by gentle swirling. The washed organic layers are then transferred to a flask and the ethers are evaporated using a rotary evaporator and a water bath at 50° C. Final traces of water can be removed by adding 50 ml acetone and evaporating to dryness, as above. The residue solution is then transferred to a centrifuge tube with ether and evaporated to dryness with nitrogen using a water bath at 40° C. The sample should be reconstituted with 2.0 or 4.0 ml of isooctane.

The liquid chromatography cleanup step should be done immediately thereafter. The cleanup system should consist of a constant flow pump capable of liquid chromatography operating at up to 5 ml/min (Altex 110A). The cleanup system should also preferably include a 30×4.6 mm guard column packed with Spheri-5 Cyano (5-micron particlesite, Brownlee Labs Cat #C5-GU) packing followed by a 250×4.6 mm Chromegabond Cyano, 3-micron particle size, 60 angstrom pore size (ES Industries) cleanup column. The flow rate for all columns should be 1.0 ml/min. The transfer of Vitamin D-containing portion of the cleanup eluent to the analytical column of the quantitative liquid chromatography system should preferably be automated using a 6-port column-switching valve. The continuous flow of the mobile phase through both columns can be achieved by using two high phase liquid chromatography (HPLC) pumps in conjunction with the 6-port column switching valve. The ultraviolet detector should have a sensitivity of about 0.05 AUFS at a detection wavelength of 254 or 265 nm, and a short-term noise level of 1% (Varian 2550). The cleanup system should also have a fixed-loop valve injector (Beckman 210) with a loop volume of 250 microliters. There should also be a 10 mV strip chart recorder. The cleanup mobile phase should be 0.5% amyl alcohol (99% n-pentanol minimum, preferably, Mallinkrodt No. 2996) plus 0.1% methanol in isooctane. The solution should be mixed well before use. This solution, if tightly capped, may be stored up to 2 months. The composition (% amyl alcohol) may be varied slightly to achieve the required retention time for Vitamin D.

Vitamin D standards must be made for the liquid chromatography cleanup of the extract. To make the Vitamin D standards, 24 mg of Vitamin D (D2 or D3) is accurately weighed into a 500 ml volumetric flask. The Vitamin D is dissolved and diluted to volume with isooctane. This is the stock standard. Next 7.00 ml of the stock standard is diluted to volume with isooctane in a 500 ml volumetric flask. This is the intermediate standard. Then, 5.00, 10.00, 15.00 and 30.00 ml of the intermediate standard are pipitted into individual 100 ml volumetric flasks and diluted to volume with issoctane. The solutions are mixed well. These are the working standards at about 1.3, 2.6, 4.0, and 8.0 IU/ml, respectively. Fresh standards should be weighed and prepared every 7 days. The flasks should be wrapped in aluminum foil and stored in a refrigerator at 4° C. (If the standards are kept in a refrigerator, the stock, intermediate, and working standards are stable for 7 days. If the working standards are left at room temperature for more than 4 hours, they should be prepared fresh daily from their refrigerated intermediate standards).

The next step of the liquid chromatography cleanup of the extract is to use an intermediate standard to obtain a reproducible (±15 seconds) retention time for the Vitamin D peak. The retention time should be about 15 minutes. Based on the Vitamin D peak, efficiency (N ½) of the guard and cleanup columns together should be greater than or equal to 9000 theoretical plates.

In the next step of the liquid chromatography cleanup, sample (or standard) solution is withdrawn from the tube using a clean, dry, 1 ml glass syringe. The syringe is inverted and the air bubble is pushed out of the syringe. If the solution appears cloudy or has precipitate, the solution is centrifuged or filtered using a disposable filter before filling the injection loop with the solution. The sample is injected at a volume of 250 microliters, and the timing device started to indicate when to begin collecting the Vitamin D fraction. The syringe is rinsed with acetone and dried thoroughly before the next sample injection.

From the chromatogram of the intermediate standard, it should be determined when the Vitamin D peak begins to reach the detector. Fraction collection should begin 10 seconds before this point and continue for 60 seconds. The Vitamin D fraction should preferably be switched to the analytical HPLC system.

The analytical HPLC system should also include a dual piston, constant flow liquid chromatography pump (Altex 100A). The analytical column should be 4.6×250 mm Hypersil APS II silica with a 3-micron particle size and 60 mm Angstrom pore size (Keystone). The transfer of the Vitamin D-containing portion of the cleanup column eluent to the analytical column should preferably be automated using a 6-port column-switching valve. To achieve continuous flow of mobile phase through both of the column, two HPLC pumps are used in conjunction with the 6-port column switching valve. The ultraviolet liquid chromatography detector should have a sensitivity of about 0.003 AUFS, at 254 nm or 265 nm, and short term noise level of less than or equal to 1% (Varian 2500). The valve injector (Perkin Elmer ISS-100) should be capable of injecting 250 ml. There should also be a 250 mm strip chart recorder.

The system should be equilibrated with mobile phase (0.5% amyl alcohol±0.1% methanol in isooctane) at 1 ml/min until a stable baseline is obtained (short term noise should be less than or equal to 1%). The 2.6 IU/ml standard should be injected until replicate peak heights agree to within 2%. The injection volume and/or the detector attenuation should be adjusted until the standard (I) peak height is 50 to 80% full scale. The Vitamin D retention time should be about 32 minutes including retention on the cleanup system.

To calculate the Vitamin D concentration (IU/l) for each of the working standards the following equation is used:

$$\text{Vitamin D (IU/l)} = \frac{C \times V \times 1.032 \times 1000}{S \times 0.918}$$

where: C=Vitamin D concentration (IU/ml) for sample preparation calculated from the final standard curves; V=the final dilution volume of the extract (2.0–4.0/ml); 1.032=the product density; 1000—the conversion factor for liters to milliliters; S=the sample size in grams; and 0.918=the Vitamin D to pre-vitamin D ratio (based on thermodynamic/kinetic data, which data was experimentally confirmed).

A system to model the behavior of Vitamin D that allowed experiments to be concluded more rapidly due to increased temperatures and allowed more rapid Vitamin D determinations was also developed. The aqueous ethanol model system generally employed 10 ml of ethanol containing Vitamin D or a related compound and 10 ml of aqueous solution or dispersion of another component. This solution was then heated under a nitrogen atmosphere at 60° C. and evaluated for Vitamin D degradation over a period of 7 days. Vitamin D determinations were performed by direct injection of an aliquot reconstituted in isooctane following evaporation under nitrogen at 50° C. For reverse phase HPLC systems, Vitamin D determinations were performed by direct injection of an aliquot or dilution of an aliquot. This was the system that confirmed the degradation of Vitamin D by extensively hydrolyzed proteins and, specifically, by cystine and/or cysteine (cyst(e)ine).

The emulsion model system was developed in order to better mimic the physical and chemical conditions in a liquid nutritional product. In this system, a solution (in water or vegetable oil) of one or more components (including Vitamin D or a Vitamin D related compound) are bench-homogenized into a Vitamin D-free or protein hydrolysate-free base product. This emulsion was then heated under a nitrogen atmosphere at 50–70° C. and evaluated for Vitamin D or Vitamin D-like degradation over a period of 7 days. Vitamin D determinations were performed by the same method as that described above.

To study the effects of different substances and amounts of substances on the stability of Vitamin D, an elevated temperature study was run as well as a room temperature study. In room temperature studies, accurate estimates of Vitamin D degradation rates often require 4 to 6 months under conditions of 72° F. (22° C.). In order to facilitate more rapid results, products can be evaluated for Vitamin D degradation at elevated temperatures 130° F. (55° C.). At elevated temperatures, the rate of Vitamin D degradation is approximately 30 times faster than that at room temperature. This allows accurate estimates of Vitamin D degradation rates in 3 to 4 weeks instead of 4 to 6 months. Furthermore, room-temperature and elevated temperature evaluations of Vitamin D degradation in liquid nutritional products allows correlations to be established with the aqueous ethanol model system and the emulsion model system.

The above discussed method for determining the amount of Vitamin D in solution was then used to determine if the isomerization and degradation of Vitamin D to biologically inactive forms was dependent on the existence of polypeptide chains or if it were possible to generate similar data using a mixture of free amino acids. An initial homogeneous mixture of histidine, tyrosine, isoleucine, glutamine, methionine, tryptophan, valine, arginine, lysine, glutamic acid, aspartic acid, glycine, cystine, alanine, leucine, threonine, phenylalanine, and serine was made. Vitamin D3 was added. Following incubation, this mixture resulted in a loss of Vitamin D. The results are set forth in Table 1. As can be seen, the percent recovery, relative to control, was less than 31%. Once it was determined that free amino acids were capable of causing Vitamin D loss through isomerization, the next step was to pinpoint the amino acid responsible for the loss.

The initial mixture was divided into four samples. Sample #1 contained histidine, tyrosine, isoleucine, proline, and methionine. Sample #2 contained the amino acids in Sample #1 plus tryptophan, valine, arginine, and lysine. Sample #3 contained glutamic acid, aspartic acid, cystine, and glycine. Sample #4 contained glutamine, alanine, leucine, threonine, phenylalanine and serine. As can be seen in Table 1, Samples #1, #2, and #4 did not experience significant loss in Vitamin D. However, Sample #3 yielded substantial loss in Vitamin D compared to those observed with the initial mixture.

TABLE 1

| Amino Acid Mixture | Relative Recovery of Vitamin D | | |
|---|---|---|---|
| | Control D3 Recovery (IU/1) | Sample D3 Recovery (IU/1) | % D3 Recovery |
| Original | 3490 | 1067 | 31 |
| Sample #1 | 3490 | 3211 | 92 |
| Sample #2 | 3490 | 3289 | 94 |
| Sample #3 | 3447 | 1224 | 37 |
| Sample #4 | 3447 | 3364 | 98 |

A fifteen amino acid mixture containing histidine, tyrosine, isoleucine, proline, methionine, tryptophan, valine, arginine, lysine, glutamine, alanine, leucine, threonine, phenylalanine, and serine was evaluated as above. The results are shown in Table 2, with the fifteen amino acid mixture being Sample #5. Put another way, Sample #5 contains the amino acids of Samples #2 and #4. The recovery of Vitamin D3, relative to the control, was over 95%. Thus a combination of up to 15 free amino acids was shown to yield virtually no Vitamin D loss.

An eighteen amino acid mixture was then evaluated. It contained histidine, tyrosine, isoleucine, glutamine, methionine, tryptophan, valine, arginine, lysine, glutamic acid, aspartic acid, glycine, proline, alanine, phenylalanine, leucine, threonine and serine. The results are shown in Table 2, with two evaluations having been made of this mixture, Sample #6. The recovery of Vitamin D3, relative to the control, was over 95%. Finally, a mixture of histidine, tyrosine, isoleucine, proline, methionine, glutamic acid, aspartic acid, glycine, and cystine was evaluated. The results are set forth as Sample #7. Put another way, Sample #7 contains the amino acids of Samples #1 and #3. However, while the respective Vitamin D recoveries for Samples #1 and #3 were greater than 95% and between 30–40%, respectively, mixing the two provided Vitamin D yields of less than 17%.

TABLE 2

| Amino Acid Mixture | Relative Recovery of Vitamin D | | |
|---|---|---|---|
| | Control D3 Recovery (IU/1) | Sample D3 Recovery (IU/1) | % D3 Recovery |
| Sample 5 | 3302 | 3264 | 99 |
| Sample 6 | 3302 | 3340 | 101 |
| Sample 6 | 3385 | 3234 | 96 |
| Sample 7 | 3302 | 543.16 | 16 |

Thus, the results of this study indicated a need for cystine in initiating the degradation process of Vitamin D. Amino acid mixtures which did not contain cystine did not yield significant losses of Vitamin D as did mixtures which contained cystine.

The involvement of cystine presents another problem. Well known preservatives such as BHT and BHA work well to inhibit free radical reactions of oxygen containing compounds; however they are ineffective in slowing Vitamin D degradation rates because they are unable to effectively donate a hydrogen atom to a thiyl free radical where the odd electron resides on or near the sulfur of the sulfur based radical. Additionally, most conventional anti-oxidants are oil soluble compounds which are undesirable in this instance, since the major source of thiyl radicals is the aqueous phase. Hence, a water soluble compound would be preferable.

Under the Infant Formula Act in the U.S.A. there are certain maximum and minimum levels associated with the concentration of Vitamin D. For example, the upper limit for a 20 calories/fl. oz. product is 676 IU/1, or 100 IU/100 calories. Due to degradation, the liquid nutritional product is typically fortified at a higher level prior to the preliminary heat treating of the product. The pre-process Vitamin D fortification level of one commercially available infant formula is in excess of that upper limit, however by zero-time (the time when the container is ready for shelf-life) the Vitamin D concentration has dropped below that limit. Over a prolonged period of time the Vitamin D concentration can decrease to below the acceptable minimum. According to the Infant Formula Act in the U.S.A., the acceptable minimum level of Vitamin D is 40 IU/100 calories or 270 IU/1 for an infant formula containing 20 calories/fl. oz. Practically speaking, the product, if still on the shelf, must then be recalled or exchanged due to its no longer satisfying the requirements of the Infant Formula Act. The present invention may be employed in liquid nutritional products other than infant formula for which the acceptable minimum and maximum concentrations of Vitamin D may, of course, vary.

Although Vitamin C has been added to infant formula comprising a hydrolyzed protein source, the fortification level has typically been in the 200–300 mg/1 range, such that the zero time concentration is 100–160 mg/1. Based on the above discoveries, it was discovered that increasing the fortification concentration to 500–750 mg/1 resulted in a zero time Vitamin C concentration of 375–475 mg/1 which significantly decreased the degradation rate of Vitamin D. Correspondingly, the product shelf-life dramatically increased. These results were based on storage of packaged product at room temperature, as well as at elevated temperatures of about 55° C. which permitted conclusions to be reached in weeks instead of months.

Table 3 shows the degradation rate of Vitamin D in hydrolyzed product with a typical Vitamin C fortification rate of 230 mg/1 versus similar hydrolyzed product with preservatives that work well to inhibit free radical reactions of oxygen containing compounds. These preservatives were added at concentrations not normally associated with pro-oxidant activity.

TABLE 3

Degradation of Vitamin D in IU/1 at a Temperature of 22° C.; Time in months

| | TIME 0 | MONTH 3 | MONTH 6 | MONTH 10 | PROJECTED MONTHS NEEDED FOR VITAMIN D TO GO FROM 600 IU/1 to 300 IU/1 |
|---|---|---|---|---|---|
| Control Formula | 556 | 556 | 465 | 358 | 12.7 |
| Formula w/BHA | 655 | 573 | 456 | 322 | 8.6 |
| Formula w/BHT | 598 | 501 | 390 | 294 | 9.8 |

Table 4 shows the degradation rate of Vitamin D in hydrolyzed product, compared with formula having increased amounts of Vitamin C added. Also, product was tested comprising a physical barrier, for example a series of single- or multiple-layers of molecules which would retard migration of the radicals. An example of such a physical barrier would be the emulsifier PANODAN®, the diacetyl tartaric acid esters of mono- and diglycerides. PANODAN® is distributed by Grinstead of Danisco, Denmark.

TABLE 4

Degradation of Vitamin D in IU/1 at a Room Temperature 22° C.; Time in months

| | TIME 0 | MONTH 3 | MONTH 6 | MONTH 12 | PROJECTED MONTHS NEEDED FOR VITAMIN D TO GO FROM 600 IU/1 to 300 IU/1 |
|---|---|---|---|---|---|
| Control Formula | 635 | 610 | 566 | 446 | 18.2 |
| Formula with Vitamin C | 583 | 552 | 540 | 445 | 28.3 |
| Formula with PANODAN® | 629 | 605 | 529 | 495 | 27.8 |
| Formula with Vitamin C/and PANODAN® | 623 | 582 | 572 | 524 | 38.2 |

Without Vitamin C and PANODAN® the Vitamin D is subject to the normal rate of free radical attack. With PANODAN® alone, the rate of free radical attack was lower. When no PANODAN® was added to the product, and high concentrations of Vitamin C were added, the rate of free radical attack was similarly low. When the concentration of Vitamin C was high and PANODAN® was added, the rate of free radical attack was lowest. Finally, when the concentration of Vitamin C was high and PANODAN® was added, the rate of free radical attack was its lowest. The amount of PANODAN® added should correspond to between 3-6%, by weight, of the fat content of the nutritional product, which fat content is typically in the range of 3-3.5%, by weight.

It was further discovered that improved results could be obtained by adding cystine to the formulation of the liquid nutritional product after the completion of preliminary heat treating. This permits the fat soluble Vitamin D to become effectively "trapped" in the fat of the emulsion, thereby reducing the chance of attack by a free radical, especially where PANODAN® is also present. The late addition of cystine also minimizes the effect of its auto-oxidative properties, thereby reducing the rate of Vitamin D degradation.

BEST MODE

Tables 5, 6 and 7 compare Vitamin D degradation in a protein hydrolysate-based nutritional product control and in a nutritional product comprising cystine, Vitamin C and PANODAN®. In these tables the term "early" means the ingredient(s) was added prior to the beginning of preliminary heat treating and the term "late" means the ingredient(s) was added after the completion of preliminary heat treating.

TABLE 5

Degradation of Vitamin D in IU/1 at a Temperature of 55° C.; Time in weeks

| | TIME 0 | WEEK 2 | WEEK 4 | PROJECTED WEEKS NEEDED FOR VITAMIN D TO GO FROM 600 IU/1 to 300 IU/1 |
|---|---|---|---|---|
| Control, 230 mg/1 Vitamin C late | 547 | 194 | 69 | 1.3 |
| PANODAN® Cystine late, 600 mg/1 Vitamin C late | 556 | 311 | 119 | 2.0 |
| PANODAN® Cystine late, 750 mg/1 Vitamin C late | 577 | 317 | 173 | 2.4 |

Table 5 shows a control with a Vitamin C fortification level of 230 mg/1 and an initial Vitamin D concentration of 547 IU/1, such that shelf-life of the product with respect to Vitamin D was 1.3 weeks. The control's zero time Vitamin C concentration was 104 mg/1. Meanwhile, when PANODAN® is employed as an emulsifier and cystine is added late, and the fortification levels of Vitamin C are 600 mg/1 and 750 mg/1 respectively, the zero time Vitamin C concentrations are 387 mg/1 and 580 mg/1 respectively, and the shelf-life of Vitamin D improves to 2.0 and 2.4 weeks respectively.

TABLE 6

Degradation of Vitamin D in IU/l at a Temperature of 22° C.; Time in months

|  | TIME 0 | MONTH 3 | MONTH 6 | MONTH 12 | PROJECTED MONTHS NEEDED FOR VITAMIN D TO GO FROM 600 IU/l to 300 IU/l |
|---|---|---|---|---|---|
| Control 230 mg/l Vitamin C | 533 | 428 | 331 | 219 | 11.7 |
| PANODAN ® 500 mg/l Vitamin C early, Cystine late | 605 | 584 | 545 | 466 | 27.3 |
| PANODAN ® 750 mg/l Vitamin C early, Cystine late | 679 | 661 | 622 | 569 | 37.0 |

Table 6 shows a control with a Vitamin C fortification level of 230 mg/l and an initial Vitamin D concentration of 533 IU/l such that the shelf life of the product with respect to Vitamin D was 11.7 months. The suggested beneficial effects of using PANODAN ® with the late addition of cystine and the addition of increased levels of Vitamin C shown in the elevated temperature environment of Table 5 was confirmed in Tables 6 and 7 at lower temperatures. As the fortification concentration of Vitamin C was increased from 500 to 750 mg/l, the Vitamin C concentrations at zero time were 284 and 459 mg/l respectively. The shelf-life of the product with respect to Vitamin D degradation increased dramatically from 27.3 to 37.0 months.

TABLE 7

Degradation of Vitamin D in IU/l at a Temperature of 22° C.; Time in months

|  | TIME 0 | MONTH 3 | MONTH 6 | PROJECTED MONTHS NEEDED FOR VITAMIN D TO GO FROM 600 IU/l to 300 IU/l |
|---|---|---|---|---|
| Control, 230 mg/l Vitamin C late | 547 | 478 | 398 | 14.2 |
| PANODAN ® 750 mg/l Vitamin C late, Cystine late | 577 | 562 | 488 | 24.2 |
| PANODAN ® 750 mg/l Vitamin C late, Cystine early, | 562 | 465 | 422 | 11.7 |

Table 7 shows that the addition of cystine late in the preliminary heat treating produces a greater reduction in Vitamin D degradation.

Comparing Tables 6 and 7, it is seen that the addition of increased amounts of Vitamin C to liquid nutritional products containing hydrolyzed protein prior to the preliminary heat treating results in less degradation of Vitamin D during preliminary heat treating. Additional Vitamin C can be added at the end of preliminary heat treating to further retard the degradation of Vitamin D during the shelf-life of the product. However, in liquid nutritional products for infants there are problems associated with having to add Vitamin C both before and after preliminary heat treating. By adding Vitamin C after the completion of preliminary heat treating, and by keeping the Vitamin D fortification level at around 750 IU/l, the Vitamin D level at zero time is around 650 IU/l, which is an acceptable value under the Infant Formula Act and results in increased shelf life for the liquid nutritional.

While the method herein described constitutes a preferred embodiment of this invention, it is to be understood that the invention is not limited to this precise form of the method and that changes may be made therein without departing from the scope of the invention, which is defined in the appended claims.

We claim:

1. A method for improving the stability of Vitamin D in a liquid nutritional product for infants which contains a nitrogen source selected from the group consisting of hydrolyzed proteins and free amino acids, said method comprising the steps of:
   (a) adding an emulsifier to said liquid nutritional product, and subjecting the liquid nutritional product to a preliminary heat treatment;
   (b) adding Vitamin C to said liquid nutritional product such that the concentration of Vitamin C is at least 300 mg/l during the shelf-life of said liquid nutritional product; and
   (c) adding cystine to said liquid nutritional product.

2. The method according to claim 1 wherein said emulsifier comprises a diacetyltartaric acid ester of monoglycerides and diglycerides.

3. The method according to claim 1 wherein said Vitamin C when added is at a concentration in the range of 300–750 mg/l.

4. The method according to claim 1 wherein said Vitamin C when added is of a concentration in the range of 500–750 mg/l.

5. A liquid nutritional product comprising:
   (a) a source of nitrogen selected from the group consisting of hydrolyzed proteins and free amino acids;
   (b) Vitamin D;
   (c) Vitamin C at a concentration of 300–750 mg/l;
   (d) an emulsifier comprising a diacetyltartaric acid ester of monoglycerides and diglycerides; and
   (e) cystine.

* * * * *